United States Patent [19]

Miller et al.

[11] Patent Number: 5,146,519
[45] Date of Patent: Sep. 8, 1992

[54] ROTARY VARIABLE OPTICAL TAP

[75] Inventors: William J. Miller, Corning; Alan J. Morrow, Elmira, both of N.Y.

[73] Assignee: Corning Incorporated, Corning, N.Y.

[21] Appl. No.: 573,828

[22] Filed: Aug. 28, 1990

[51] Int. Cl.$^5$ .............................................. G02B 6/26
[52] U.S. Cl. ................................... 385/43; 385/39; 385/421
[58] Field of Search ............... 350/96.15, 96.20, 96.21, 350/96.13; 385/39, 40, 41, 42, 43

[56] References Cited

U.S. PATENT DOCUMENTS

| | | | |
|---|---|---|---|
| 4,753,501 | 6/1988 | Battle | 350/96 |
| 4,759,597 | 7/1988 | Lemonde | 350/96 |
| 4,763,977 | 1/1985 | Kawasaki et al. | 350/96.15 |
| 4,834,488 | 5/1989 | Lee | 350/96.21 X |
| 4,896,935 | 1/1990 | Lee | 350/96 |
| 4,931,076 | 6/1990 | Berkey | 65/4.2 |
| 4,948,217 | 8/1990 | Keck et al. | 350/96.15 |
| 4,989,946 | 2/1991 | William et al. | 350/96.21 X |
| 4,991,922 | 2/1991 | Dahlgren | 350/96.15 |
| 5,017,206 | 5/1991 | Miller et al. | 350/96.15 |
| 5,058,979 | 10/1991 | Yamauchi et al. | 385/43 X |

FOREIGN PATENT DOCUMENTS 0048855 4/1982 European Pat. Off. .
WO89/12243 12/1989 PCT Int'l Appl. .

OTHER PUBLICATIONS

Applied Optics, Nov., No. 21, New York, N.Y., USA, Control of Wavelength Selectivity of Power Transfer in Fused Biconical Monomode Directional Couplers.

Primary Examiner—John D. Lee
Assistant Examiner—Phan Thi Heartney
Attorney, Agent, or Firm—K. McNeill Taylor, Jr.

[57] ABSTRACT

An apparatus for selectively transmitting input optical signals carried on input optical fibers to output optical fibers. A three refractive index tapered wave guide structure is bent and maintained in the bent state. This structure is, thereafter, rotated in the bent state. The coupling characteristics are tunable based on the degree of rotation.

6 Claims, 4 Drawing Sheets

ROTARY VARIABLE OPTICAL TAP

BACKGROUND OF THE INVENTION

Communications systems are well known. Conventional electronic communications rely on electrons passing through wires. Radio-frequency and microwave communications rely on radio waves and microwaves travelling through open space. The crucial difference between these systems and fiber optic communication systems is that, in the latter, signals are transmitted as light.

The advantages of fiber optic communications have led to many applications in long-haul and short-distance communications. Examples include optical local-area networks, under-sea telecommunication systems, connections between control facilities, cable television, and portable communication equipment for military use.

A key element of a fiber optic communication system is the optical fiber. The two key elements of an optical fiber are its core and cladding. The core is the central region of the optical fiber, through which light is guided. The cladding is the outer region, completely surrounding the core. Light traveling through the core is confined in the core. Light that strikes the core/cladding boundary remains in the core because the refractive index of the core is higher than that of the cladding.

A splitter is an optical fiber coupling device having at least one input optical fiber and at least one output optical fibers. Functionally, a splitter optically connects the input optical fiber to the output optical fibers so that light energy is divided among the output optical fibers. The input light energy need not be divided equally among the output optical fibers. For example, it may be desirable for approximately 10% of the input light to emerge from one output and approximately 90% from another. Many applications require branching a video signal for cable television to several streets in a neighborhood. In such a system, the splitter must take the incoming signal from the main office and split the signal between the streets and the subsequent homes on the streets. A splitter will be used at each split point.

A combiner is an optical fiber coupling device having at least two input optical fibers and at last one output optical fiber. Functionally, a combiner optically connects the input optical fibers to the output optical fibers so that light energy is combined into the single output optical fiber.

A coupler transfers light energy between two coupled optical fibers. A coupler may be utilized as either a splitter or combiner.

Manufacturers of optical fiber couplers usually provide devices which are designed to operate at preselected operating wavelengths or have fixed coupling characteristics. Customers, on the other hand, often require devices that have variable coupling characteristics and operating wavelengths or allow changing the spectral properties after installation.

Many couplers operate on the principle that coupling occurs between the cores of two adjacent optical fibers. Early couplers were made by applying heat directly to the optical fibers to be joined, producing a very fragile coupler. Because of their small size, these fused couplers were inherently less robust and environmentally unstable. To provide a mechanically strong coupler, the optical fibers may be joined together in a matrix glass, referred to as an overclad, having a refractive index less than that of the cladding material and tapered to bring the optical fiber cores closer together to induce coupling.

Overclad fiber optic couplers are conventionally formed, as illustrated in FIGS. 1-4, from a glass capillary tube 13. As shown in FIGS. 1 and 2, tube 13 has a longitudinal aperture 16 which may be diamond shaped, as depicted in FIG. 2. Two waveguides 11,12 are positioned within diamond shaped aperture 16, as shown in FIG. 2, extending through tube 13. The midregion of tube 13 is heated, collapsed about waveguides 11, 12 and drawn to reduce the diameter. As a result, and as shown in FIG. 3, a tapered mid-region 14 is formed. As shown in FIG. 4, the cores 11a and 12a are positioned adjacent each other in the midregion 14.

As a result, light input to waveguide 11 is distributed between the output of waveguide 11 and/or waveguide 12 of FIG. 3, as determined by the coupling ratio. For example, light of a single wavelength initially enters waveguide 11 but not waveguide 12. Light traveling along waveguide 11 is transferred from waveguide 11 to waveguide 12. The amount of light transferred is dependent upon the geometry of coupling region 14, cores 11a, 12a and claddings 11b, 12b and their refractive indices, and the refractive index of the overcladding tube 13.

Alternatively, light of a single wavelength may initially enter waveguide 12 but not waveguide 11, wherein the light traveling along waveguide 12 is transferred from waveguide 12 to waveguide 11. The input and output pigtails of waveguides 11, 12 may be kept intact, so that in the event one input becomes inoperable the coupler will remain operable.

When substantially all the input light is to be distributed first to the output of one optical fiber and alternatively to the output of a second optical fiber, a switch is required. An optical switch merely transfers substantially all input light of a single wavelength from one output optical fiber a second output optical fiber. A switch is a two state device, operating either on or off. The coupler described above be used as a switch, wherein the output of the coupler may be controlled by bending the coupler. The fiber-in-tube coupler of FIG. 3 is stiff enough to allow for reproducible and easily controlled bending, yet it is not so large as to require large forces to bend the coupler.

Some applications require a coupler wherein one can vary the division of the input signal between the first and second output optical fibers. The term for this device is a variable tap. A variable tap operates in many states; the coupling ratio is not limited to two states, as in the optical switch. In one form of a variable tap, the angle of bending of the coupler is varied whereby the light is selectively transferred among the output optical fibers.

Conventional fiber optic switches typically consist of optical fibers with opposing end sections capable of connection or disconnection by various means. A prior art fiber optic switching device for use in optical fiber systems is disclosed in J. Lemonde U.S. Pat. No. 4,759,597, issued on Jul. 26, 1988. The disclosed switch consists of an optical fiber with a moving end which can be displaced between two positions. The moving end is mechanically aligned with the fixed end of a second or third optical fiber. The transmission path is switched from the first optical fiber to the second or third optical fiber. A significant problem with this design is the fact that the necessary accuracy required for alignment of the optical fibers is difficult to achieve. Another drawback is the difficulty of obtaining a low attenuation coefficient due to the gap between the optical fibers.

S. Battle U.S. Pat. No. 4,753,501, issued on Jun. 28, 1988, discloses an optical switch also utilizing alignment of optical fibers to switch the transmission path. The input optical fiber is connected to a rotary shutter. The input optical fiber is rotated to a number of different positions for alignment with output optical fibers. This switch suffers from the same drawbacks as the Lemonde switch, alignment inaccuracy and high attenuation.

H. Lee U.S. Pat. No. 4,896,935, issued on Jan. 30, 1990, discloses a fiber optic switching device comprising input and output optical fibers to be optically aligned for switching the optical paths. The fixed input optical fibers may be aligned with moveable output optical fibers. The output optical fibers are moved between input optical fiber positions. An alternative embodiment is directed to rotation of an array of output optical fibers for alignment with the input optical fibers.

The problem of aligning optical fibers for switching was recognized in the art. One of the approaches to solving this problem, which is evidenced by the prior art, is the concept of perturbation, for example bending the tapered region of a pair of waveguides, thereby altering its coupling performance.

In one type of such a device, a two refractive index structure is bent in order to switch the transmission paths. For example, EP 0 048 855 A3 by E. Klement discloses a dual core optical fiber which is bent to change the degree of coupling between the cores. When the optical fiber is bent, the first core is compressed and the second core is elongated. Reverse bending of the dual core optical fiber suspends the coupling of the cores.

B. Kawasaki et al. U.S. Pat. No. 4,763,977, issued Aug. 16, 1988, is also directed to a coupler comprising a pair of optical fibers fused together at a narrowed region. The coupler is bent in the narrowed region, whereby a coupling ratio can be selected.

Although the Klement and Kawasaki bending devices avoid the alignment and low attenuation drawbacks, the couplers are sensitive to vibration, pressure, temperature, etc. and therefore reproducibility of the coupling ratio may vary over time. Also, a substantial force is required to bend the coupler each time the switch is used.

It is therefore an object of the present invention to provide a variable optical tap that requires less force to vary the coupling ratio.

Another object of the present invention is to provide a variable optical tap that is less sensitive to perturbation.

Another object of the present invention is to provide an optical switch wherein the transmission signal never leaves the glass structure, eliminating the air to glass interface.

Another object is to provide a thermally stable variable optical coupler.

SUMMARY OF THE INVENTION

In the present invention, a three refractive index structure, known in the art, is bent and maintained in the bent state. The coupler is, thereafter, rotated in the bent state. The coupling characteristics are tunable based on the degree of rotation. To transfer approximately 100% of the power, the coupler is rotated approximately 90 degrees. Transferring less than the total power requires less than a 90 degree rotation.

The invention may be used as a switch whereby approximately 100% power transfer occurs at the desired wavelength. At approximately 100% power transfer, substantially all of the light entering a first optical fiber will emerge from a second optical fiber. As will be further explained hereinafter, different coupler designs may be used to provide different coupling ratios as a function of the angle of rotation.

To form a switch embodying the present invention, a fiber-in-tube coupler is bent until the bending radii of the optical fiber cores is unequal. In a preferred embodiment, the coupler is bent until there is no power transfer, i.e. when substantially all the light entering in the first optical fiber emerges from the same first optical fiber. When one desires the light again to emerge from the second optical fiber, the coupler is rotated while remaining in the bent state.

In one embodiment of the present invention, a fiber-in-tube coupler is mounted at one end in a rotary bearing which is fixed to a baseplate. The coupler is positioned so that the cores of the two fibers lie in a plane parallel to the baseplate. The end of the coupler in the rotary bearing is held fixed and the coupler is bent, while the fiber cores are maintained co-planar with the baseplate. In this configuration, the bending radii of the optical fibers are unequal.

In a preferred embodiment, the coupler is bent until substantially total power transfer has occurred, which is defined as the on position. The opposite end of the coupler is then mounted to the baseplate in a rotary bearing, whereby the coupler is fixed in the bent state. If the coupler is then rotated in the constant bend configuration, the coupling is inhibited and this is defined as the off position.

In an alternative embodiment of the present invention, a coupler is inserted into a previously bent tube. The tube is of similar composition to the coupler. The coupler is rotated within the tube whereby the coupling ratio is varied.

DETAILED DESCRIPTION OF THE INVENTION

The present invention is directed to a rotary variable optical tap for transferring a light input from one optical fiber to another optical fiber. The optical fibers are joined together in a matrix glass having a refractive index less than that of the cladding material and tapered to bring the optical fiber cores close together to induce coupling. In a first state, the light transmitted into a first optical fiber is coupled to and exits along the path of a second optical fiber.

The coupling ratio is reduced upon bending the optical fibers. The angle of bend determines the reduction of light coupled from the first optical fiber to the second optical fiber. The coupler has reached the maximum necessary angle of bend when the light transmitted into the first optical fiber remains in the first optical fiber's path because coupling is inhibited.

In a preferred embodiment of the invention the coupler is fixed in a bent state with rotary bearings at each end. When the two fibers are within a plane such that the difference in their bending radii is maximized, coupling is inhibited. To return to the coupled state, the coupler is rotated approximately 90 degrees whereby the output of the first optical fiber is switched into the second optical fiber. The coupler is tunable throughout the rotation. For a preferred embodiment of the coupler, rotating the coupler approximately 45 degrees results in approximately 50% of the input light emerging from both the first and second optical outputs.

Figure 3:
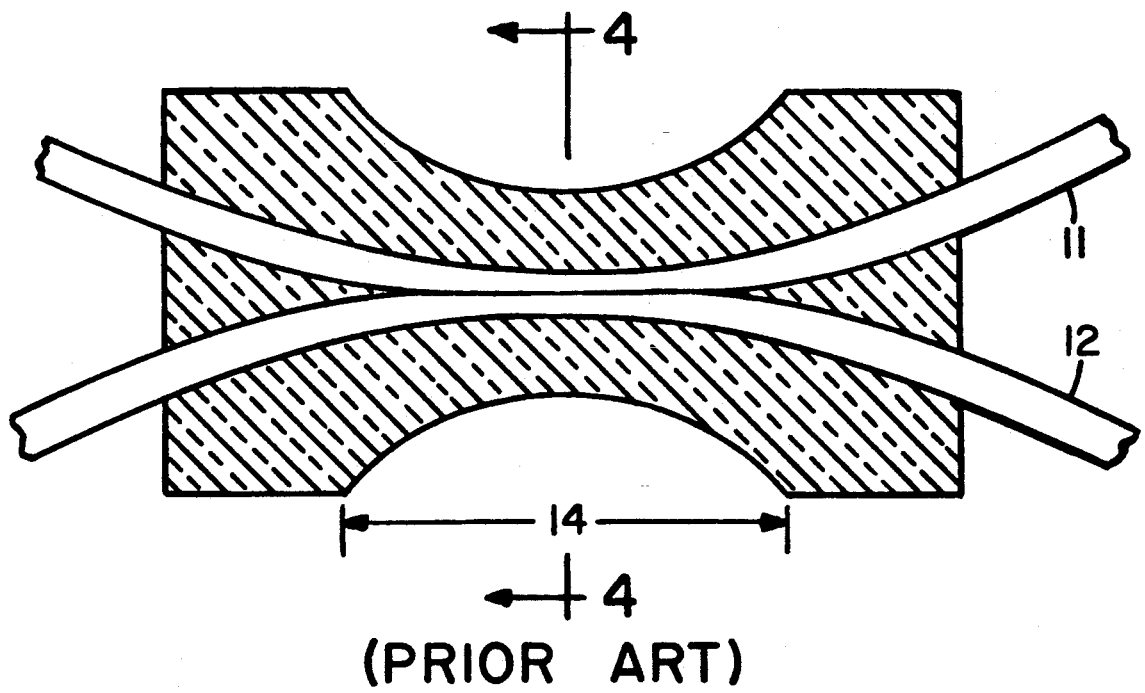
FIG. 3 is a cross-sectional view illustrating the coupler after the collapse of the glass tube around the fibers and drawing of the midregion.

The present invention includes a fiber optic coupler 10 illustrated in FIG. 3 and made in accordance with U.S. Pat. No. 4,931,076, entitled "Method of Making Fiber Optic Coupler", issued Jun. 5, 1990 which is incorporated herein by reference. The drawings are not intended to indicate scale or relative proportions of the elements shown therein.

Figure 1:
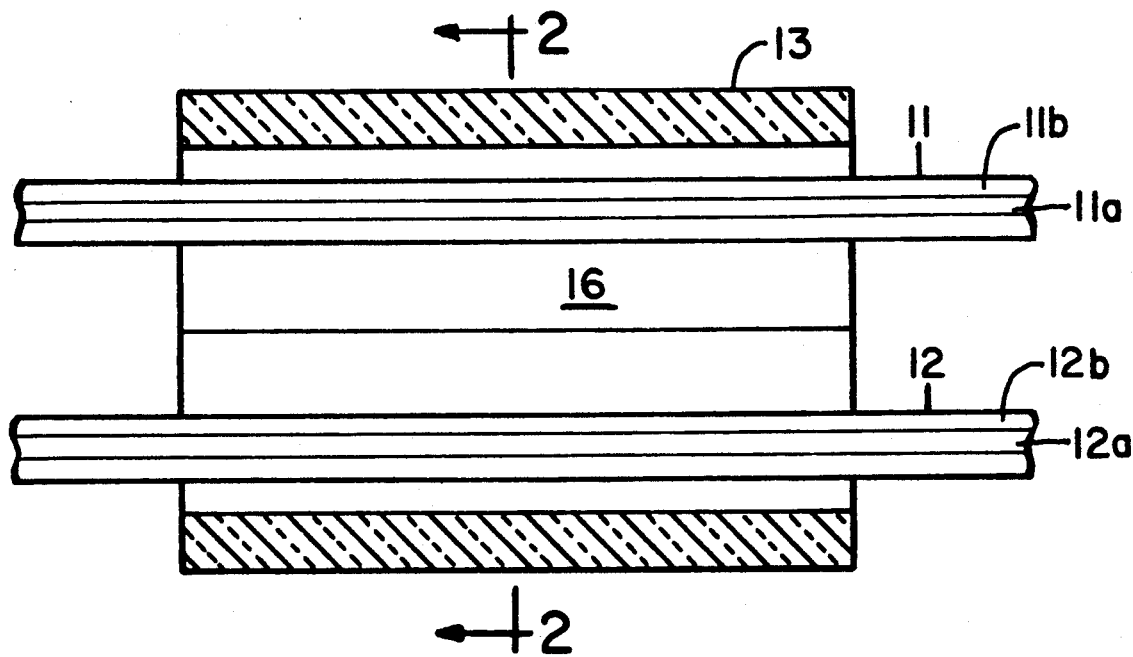
FIG. 1 is a cross-sectional view of a glass tube in which a pair of optical fibers are disposed.
Figure 2:
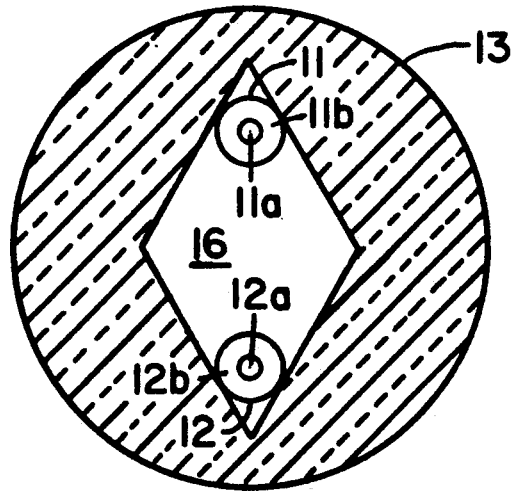
FIG. 2 is a simplified cross-sectional view of the center portion of the tube taken at 2—2 of FIG. 1.

FIG. 1 illustrates one embodiment of the coupler used in the present invention. The two waveguides 11, 12, in cross-section, are disposed within glass capillary tube 13. As illustrated in FIG. 2, the diamond shape 16 facilitates the proper alignment of the waveguides in tube 13. The pair of waveguides includes cores 11a, 12a of a predetermined refractive index $n_{1a}$, $n_{2a}$, and a cladding 11b, 12b surrounding said cores 11a, 12a and having a lower refractive index $n_{1b}$, $n_{2b}$, than said cores. The core and outer cladding diameters are 8 and 125 microns, respectively. The waveguides are selected to have either common indices of refraction at the core or sufficiently different indices such that uniform coupling is achieved. In a preferred embodiment, the difference between the core indices $n_{1a}$, $n_{2a}$ and the cladding indices $n_{1b}$, $n_{2b}$ is 0.003-0.004. Tube 13 has a lower refractive index $n_3$ than cladding 11b, 12b surrounding said waveguides 11, 12. In a preferred embodiment, the difference between the cladding indices $n_{1b}$, $n_{2b}$ and index $n_3$ is in the range of 0.001 and 0.005.

The central portion of tube 13 is heated to collapse around the waveguides, and the collapsed structure is drawn down to a predetermined diameter.

Figure 4:
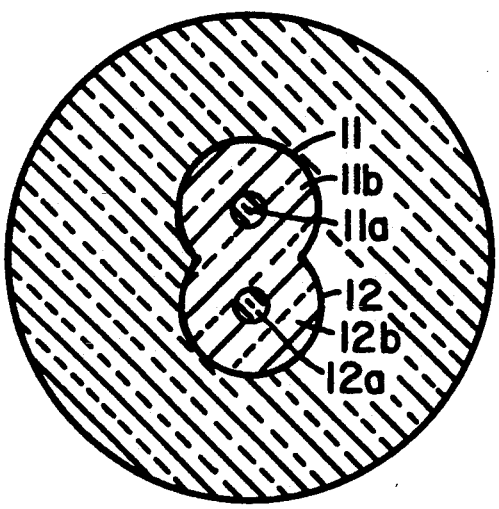
FIG. 4 shows a simplified cross-sectional view of the coupler's midregion taken at 4—4 of FIG. 3.

Waveguides 11, 12, as illustrated in FIG. 3, are tapered within coupling region 14. Coupling of light between the waveguides is induced in coupling region 14. Cores 11a, 12a of the waveguides are closer together in the center of the coupling region 14 as depicted in FIG. 4.

Coupling efficiency increases with decreasing core separation. In the case of single-mode cores, decreasing the core diameter increases the coupling efficiency.

Because any pressure or bending to the tapered region of the waveguide alters coupling performance, the output of coupler 10 is controlled by bending the coupler within the coupling region 14. The coupler is bent in the horizontal plane parallel to the baseplate, a plane which passes through the two cores.

Figure 5:
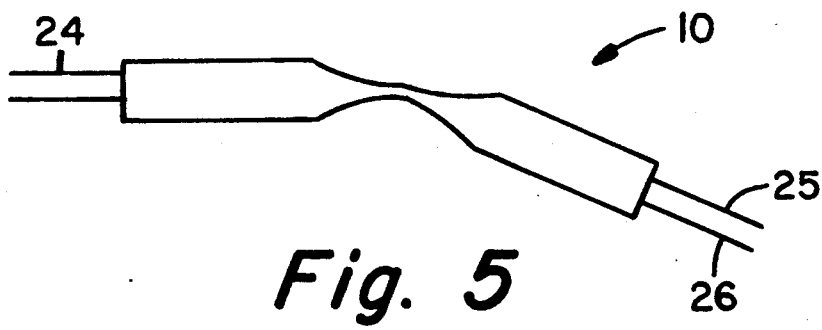
FIG. 5 is a top view of the first embodiment of the present invention.
Figure 6:
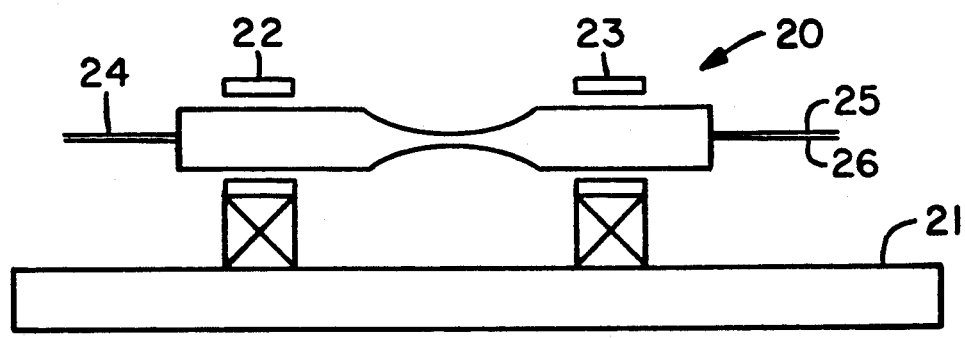
FIG. 6 is a side view of the first embodiment of the present invention.
Figure 8:
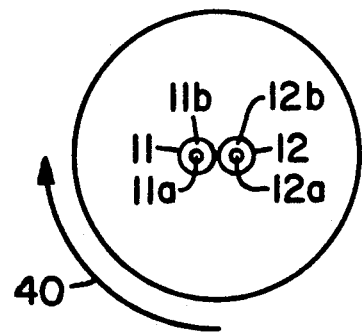
FIG. 8 is a cross-sectional view of the coupler illustrating the axis in which the optical fibers lie when the bent coupler is rotated to the on position.

Reference is now made to FIGS. 5 and 6 of the drawings for a detailed description of the present invention. The rotary variable optical tap 20 shown in FIG. 6 includes coupler 10 rotatably mounted on baseplate 21 by means of rotary bearings 22,23. Bearings 22,23 receive opposite ends of coupler 10. In the assembly of the switch, bearing 22 is first fixed to baseplate 21. Coupler 10 is rotated in the direction of arrow 40 until the plane including the two waveguide cores 11a, 12a is parallel to baseplate 21, as depicted in FIG. 8.

Light is launched into input pigtail 24. The output pigtails 25,26 of coupler 10 are thereafter attached to a measurement system (not shown). Coupler 10 is then bent in a plane parallel to the baseplate 21 until power transfer from one waveguide to the other has occurred, in other words, the device is "switched on". Bearing 23 is thereafter fixed to baseplate 21 and coupler 10 remains in the bent state.

Figure 7:
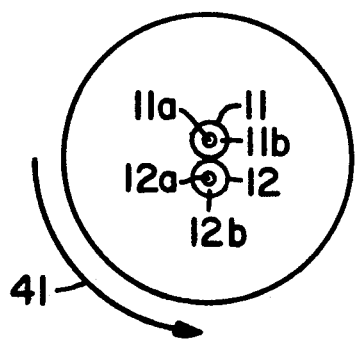
FIG. 7 is a cross-sectional view of the coupler illustrating the axis in which the optical fibers lie when the bent coupler is rotated to the off position.

When the coupler is rotated in the direction of arrow 41 approximately 90 degrees, the plane through the waveguide cores will be perpendicular to the baseplate, and the device is "switched off", as illustrated in FIG. 7.

Figure 9:
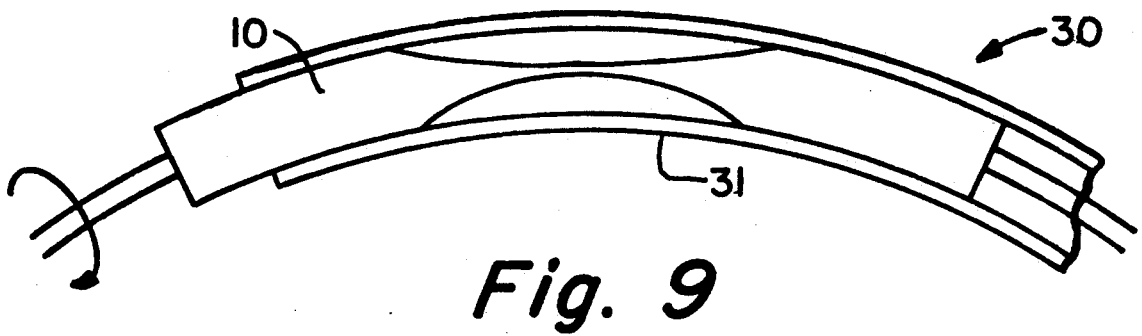
FIG. 9 is a perspective view of the second embodiment of the present invention.

The initial steps needed to form coupler 10 of the alternative embodiment depicted in FIG. 9 are the same as those employed to form that of FIG. 6. The rotary switch 30 shown in FIG. 9 includes a bent glass tube 31 surrounding coupler 10. Tube 31 is of similar composition to coupler 10. At least one end of coupler 10 extends outside of tube 31 to allow for rotation of coupler 10. The coupling ratio is varied by rotating the coupler within the bent tube as described in the first embodiment.

The rotary variable optical tap depicted in FIG. 9 will be thermally stable because the materials used for the bent tube and the coupler are chosen to have similar thermal expansions.

As will be understood, the device of FIGS. 6 and 9 will operate with either an 1×2 or 2×2 coupler and the coupler is typically optimized for operation at a single wavelength. Alternatively, the present invention may embody a coupler capable of effecting substantially uniform coupling across a predetermined broad range of wavelengths. For example, a coupler for use at the 1310nm or 1550 nm window is tuned wherein the coupling ratio of one output port is from approximately 50% to 100%.

Although the desired coupling ratio typically established for a single wavelength, it is contemplated that similar results could be achieved with one device operable at more than one wavelength. Such a coupler, known as "achromatic", is described in Miller et al. U.S. patent application Ser. No. 447,808, filed Dec. 8, 1989, now U.S. patent Ser. No. 5011251 which is incorporated herein by reference. For each discrete wavelength, coupling ratio as a function of degree of bending—i.e., angle of rotation—is different. Therefore, in this alternative embodiment of the invention, a different schedule of rotation is necessary to achieve the same coupling ratios at different operating wavelengths.

Miniature solenoids and electronics or any adjustable mechanical mechanism may be added with a properly designed interface for rotation of the coupler in either embodiment.

A specific example of a rotary variable optical tap according to the present invention follows. A glass capillary tube, refractive index of 1.442571, with a diamond shaped longitudinal aperture is provided. The tube is 38.1 millimeters in length with an outside diameter of 2.8 millimeters. The diamond shaped longitudinal aperture has four equal sides 315 microns in length. Two optical fibers, each with an 8 micron core, refractive index of 1.452009, a 125 micron outside diameter cladding, refractive index of 1.446918, and 165 micron outside diameter acrylate coating are inserted into the longitudinal aperture. A portion of the acrylate coating intermediate the optical fiber ends is removed, and the uncoated portions of the optical fibers are disposed within the longitudinal aperture of the tube. The fibers are held taut to a effect a tension within the tube.

The midregion of the assembly so formed is heated to cause it to collapse around the optical fibers, and is drawn to a predetermined diameter. After drawing to ¼ the size of the original tube, the midregion diameter is 0.7 millimeters. The core and cladding diameters are also reduced, i.e. each core diameter is reduced to 2 microns and each cladding diameter is reduced to 31.25 microns. The optical fibers are affixed and sealed to the end portions of the tube by applying glue.

A baseplate 101.6 millimeters in length, 25.4 millimeters in width and 6.35 millimeters thick is provided. Two rotary bearings with an inside diameter of 2.81 millimeters and a wall thickness of 0.50 millimeters are provided. The bearings are attached to opposite ends of the coupler. The first bearing is affixed to the baseplate. The coupler is rotated until the two optical fiber cores lie in a plane parallel to the baseplate.

The pigtails extending from the coupler are attached to a measurement system for measuring the coupling ratio. Light is launched into the input optical fiber. Examples of the coupling ratio at different wavelengths are illustrated below:

| WAVELENGTH | COUPLING RATIO |
| --- | --- |
| 1500 | 1.64/98.36 |
| 1510 | 1.05/98.95 |
| 1520 | 0.54/99.46 |
| 1530 | 0.22/99.78 |
| 1540 | 0.03/99.97 |

A lever arm is used to bend the coupler in a plane parallel to the baseplate. The coupler is bent until the coupling ratios illustrated above are reversed and the light launched into the input optical fiber emerges from the output of the same optical fiber. The second rotary bearing is then affixed to the baseplate whereby the coupler maintains the bent state.

Figure 10:
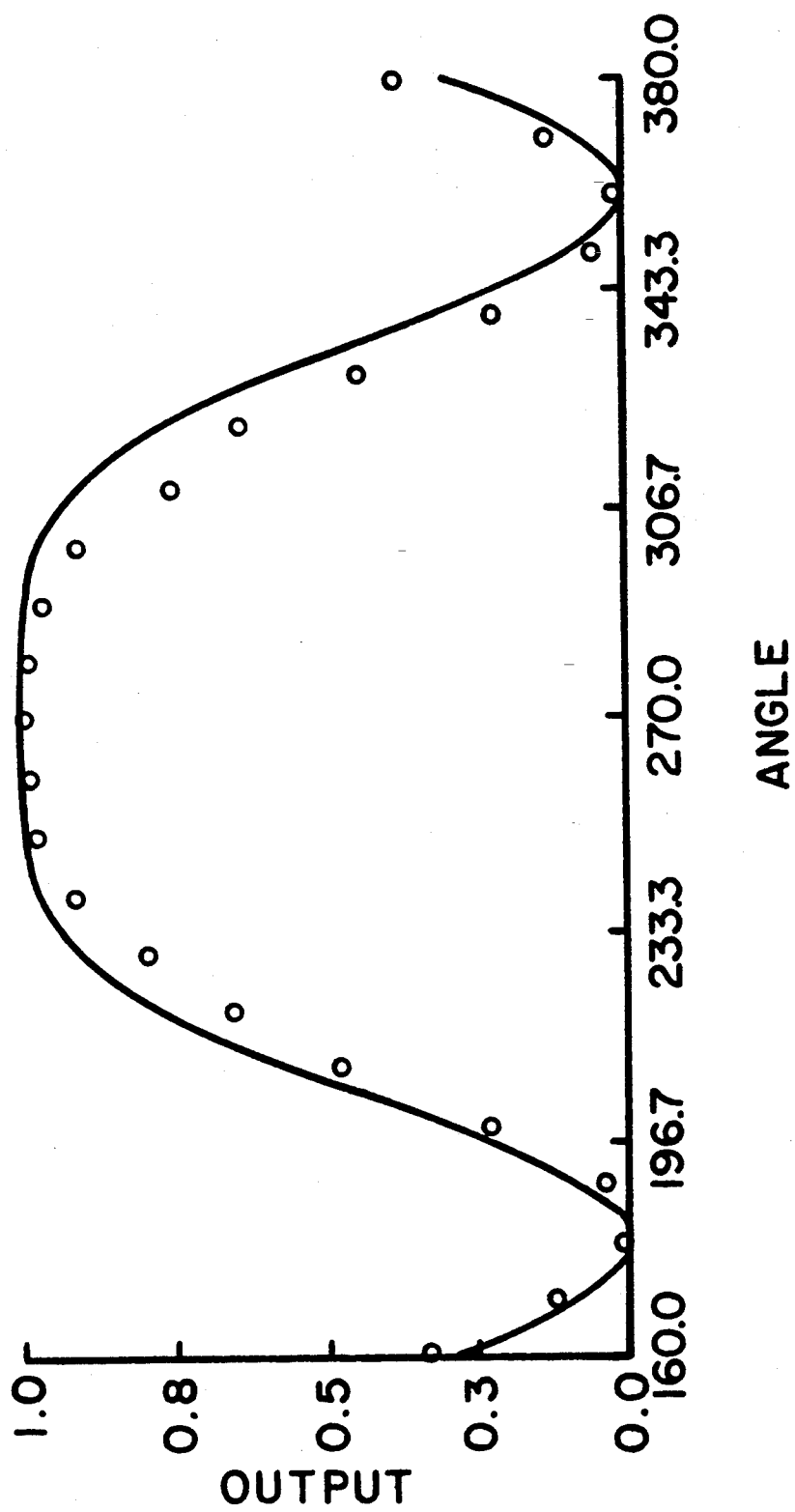
FIG. 10 is a graph of the coupling ratio change versus rotation of the bent coupler.

To rotate the coupler, a glass rod is attached to one end of the coupler. Pressure is applied to the rod causing the coupler to rotate in an arc. The coupler is rotated 90 degrees whereupon the plane containing optical fiber cores is perpendicular to the baseplate. The graph of FIG. 10 enables one to compare the coupling ratio that is obtainable for different angles of rotation. The output represents the percent of total light output in the first optical fiber core.

Although the present invention has been described with respect to a specific device, it is not intended that such specific references be limitations upon the scope of the invention which is defined as set forth in the following claims.

We claim:

1. A rotary variable optical tap comprising:
   a coupler comprising at least two adjacent waveguides, said waveguides being joined and elongated in a narrowed region to induce coupling between said waveguides;
   means for maintaining said coupler in a bent state; and
   means for rotating said coupler in the bent state to vary the degree of light coupling between said waveguides.

2. A rotary variable optical tap as described in claim 1 wherein said maintaining means comprises a bent glass tube surrounding said coupler and said rotating means comprises means for rotating said coupler within said bent glass tube.

3. A rotary variable optical tap as described in claim 1 further comprising a baseplate, wherein said means for maintaining comprises first bearing means which receives one end of said coupler and second bearing means which receives the opposite end of said coupler, said first and second bearing means mounted on said baseplate such that bending is induced in said coupler, and wherein said rotating means comprises means for rotating said coupler within said mounted bearings.

4. A rotary variable optical tap comprising:
   at least two waveguides each comprising a core of a predetermined refractive index and a cladding surrounding said core and having a lower refractive index than said core;
   an overcladding, having a lower refractive index than said cladding, surrounding said waveguides;
   said waveguides being tapered toward a narrowed region such that their core separation is reduced;
   means for maintaining said waveguides in a bent state within the narrowed region; and
   means for rotating said overcladding in said bent state to vary the degree of light coupling between said waveguides.

5. A rotary variable optical tap as described in claim 4 wherein said waveguides comprise optical fibers.

6. A method of selectively transmitting input optical signals carried on input optical fibers to output optical fibers, which comprises the steps of:
   providing a coupler comprising at least two adjacent optical fibers, said optical fibers being joined and elongated in a narrowed region to induce coupling between said optical fibers;
   bending said coupler so that the input optical signals varies with respect to the bend;
   maintaining said coupler in a bent state; and
   rotating said coupler in the bent state to vary the degree of light coupling between said optical fibers.

* * * * *